United States Patent
Persson

(10) Patent No.: US 7,334,431 B2
(45) Date of Patent: Feb. 26, 2008

(54) EVAPORATOR AND HEAT EXCHANGER WITH EXTERNAL LOOP, AS WELL AS HEAT PUMP SYSTEM AND AIR CONDITIONING SYSTEM COMPRISING SAID EVAPORATOR OR HEAT EXCHANGER

(75) Inventor: Lars Persson, Abbekås (SE)

(73) Assignee: EP Technology AB, Malmö (SE)

( * ) Notice: Subject to any disclaimer, the term of this patent is extended or adjusted under 35 U.S.C. 154(b) by 241 days.

(21) Appl. No.: 10/551,961

(22) PCT Filed: Apr. 15, 2004

(86) PCT No.: PCT/SE2004/000584

§ 371 (c)(1),
(2), (4) Date: Oct. 5, 2005

(87) PCT Pub. No.: WO2004/092663

PCT Pub. Date: Oct. 28, 2004

(65) Prior Publication Data

US 2006/0179875 A1    Aug. 17, 2006

(30) Foreign Application Priority Data

Apr. 17, 2003   (SE)  .................................. 0301170

(51) Int. Cl.
F25B 39/12 (2006.01)
(52) U.S. Cl. ....................................................... 62/515
(58) Field of Classification Search .................. 62/434, 62/513, 515; 165/167, 174, 136
See application file for complete search history.

(56) References Cited

U.S. PATENT DOCUMENTS

| 2,960,160 | A | * | 11/1960 | Goodman .................. 159/13.1 |
|---|---|---|---|---|
| 3,099,607 | A | | 7/1963 | Lustenader et al. |
| 4,398,596 | A | * | 8/1983 | Lauro et al. ................ 165/167 |
| 5,129,449 | A | * | 7/1992 | Nguyen ...................... 165/110 |
| 5,390,507 | A | | 2/1995 | Shimoya et al. |
| 5,448,899 | A | | 9/1995 | Ohara et al. |
| 5,735,343 | A | | 4/1998 | Kajikawa et al. |
| 5,974,817 | A | | 11/1999 | Prummer |
| 6,253,566 | B1 | * | 7/2001 | Ichikawa et al. ............. 62/434 |
| 6,418,749 | B2 | * | 7/2002 | Ichikawa et al. ............. 62/434 |
| 6,532,755 | B2 | * | 3/2003 | Ichikawa et al. .......... 62/228.3 |

FOREIGN PATENT DOCUMENTS

| DE | 19519985 | 11/1996 |
|---|---|---|
| EP | 1001238 | 5/2000 |
| EP | 1054225 | 11/2000 |
| FR | 1529833 | 6/1968 |
| GB | 660469 | 11/1951 |
| GB | 1163364 | 9/1969 |

* cited by examiner

Primary Examiner—Melvin Jones
(74) Attorney, Agent, or Firm—Oblon, Spivak, McClelland, Maier & Neustadt, P.C.

(57) ABSTRACT

An evaporator including an evaporating chamber equipped with a drainage. The drainage drains accumulated liquid from the evaporator's lower parts and includes an external expansion driven injector and/or an external pump. The evaporator can be used e.g. in a heat exchanger, e.g. in a heat pump system or air condition system, and the vacuum driven injector can be integrated with an expansion device of the heat exchanger. A condenser can be used together with the evaporator in a heat exchanger of the plate type realizing an integrated superheater/supercooler. This is accomplished by the definition and use of delimited interacting zones through which the cooling medium circulates under heat exchange with itself.

14 Claims, 3 Drawing Sheets

EVAPORATOR AND HEAT EXCHANGER WITH EXTERNAL LOOP, AS WELL AS HEAT PUMP SYSTEM AND AIR CONDITIONING SYSTEM COMPRISING SAID EVAPORATOR OR HEAT EXCHANGER

FIELD OF THE INVENTION

The present invention relates generally to an evaporator and more specifically to an evaporator equipped with drainage means for improving its efficiency and decrease the wear of a co-operating compressor. The invention also relates to a condenser to be used together with said evaporator in a heat exchanger of the plate type.

STATE OF THE ART

Evaporators and condensers are devices e.g. used for heat exchangers, such as e.g. slender tube heat exchangers, plate type heat exchangers, spiral heat exchangers etc. In a heat exchanger according to the plate type the media circulate inside alternating plates, typically made of metal and brazed together with sealed inlets and outlets forming closed duct systems within a package of interacting, interconnected, plates in which the media circulate under heat exchange. The published patent application WO 00/03189, A1, describes such a plate type heat exchanger in more detail.

FIG. 1 illustrates the working principle of a conventional heat exchanger with a compressor driven evaporation process. Such a heat exchanger includes an evaporation chamber 110 in which the cooling medium absorbs heat, Q, and there-after evaporates whereupon it is directed to a compressor 120 and then further directed to a condenser chamber 130 where said medium emits heat, Q, and condenses. The medium is then fed back to the evaporation chamber 110 through an expansion valve 140. A problem for the conventional heat exchanger illustrated in FIG. 1 relates to the fact that accumulated liquid in the evaporation chamber, indicated by liquid level 150 in FIG. 1, will decrease the efficiency of the heat exchanger, for reasons known to a person skilled in the art. A further problem is that said accumulated liquid also increases the amount of liquid leaving the chamber 110 with detrimental effects for the compressor 120, as known to a person skilled in the art.

One way to increase the efficiency of the heat exchanger illustrated in FIG. 1 is to provide additional heating of the medium in zone 170 and additional cooling of the medium in zone 160 in FIG. 1, by means of a so called superheater/supercooler, as known to a person skilled in the art. The superheater/supercooler function will also decrease the wear of compressor 120 in FIG. 1, since compressor 120 will receive a decreased amount of liquid. One problem in conventional heat exchangers is that these superheaters/supercoolers are realised as external units making the heat exchangers bulky and not always cost effective. A particular problem relating to heat exchangers of the plate type is that accumulated liquid medium in the lower parts of the evaporator will cause non uniform streaming with a decreased efficiency as a result.

The present invention solves or reduces the above problems.

SUMMARY OF THE INVENTION

It is an object of the present invention to solve the problems mentioned above.

One object of the present invention is thus to provide a more efficient evaporator.

Another object of the present invention is to decrease the wear of a compressor connected to, and co-operating with, an evaporator.

Still another object of the present invention is to improve the efficiency of heat exchangers in general and heat exchangers of the plate type in particular.

Still a further object of the present invention is to provide a heat exchanger of the plate type with an integrated supercooler/superheater.

The present invention provides an evaporator equipped with drainage means that drain accumulated liquid from the evaporator's lower parts. The drainage means include an injector and/or a pump.

The present invention also provides a superheater/supercooler in a heat exchanger of the plate type by providing interacting delimited zones in the heat exchanger's evaporator and condenser.

The invention is defined by the accompanying claims 1 and 6, whereas advantageous embodiments are defined by the dependent claims 2-5 and 7-14.

BRIEF DESCRIPTION OF THE DRAWINGS

The invention will be described in detail below, with reference to the accompanying drawings, of which.

DETAILED DESCRIPTION OF PREFERRED EMBODIMENTS

A problem regarding the efficiency of an evaporator is that ideally no liquid medium should leave the evaporator, i.e. the liquid content of the evaporated medium should be zero, which is hard to obtain in practise. One object of the present invention is thus to provide a more efficient evaporator by minimising the liquid content of the evaporated medium leaving the evaporator.

Another problem is that a higher liquid content of the evaporated medium will increase the wear of the co-operating compressor connected to said evaporator. Another object of the present invention is thus to decrease the wear of the compressor connected to the evaporator by minimising the liquid content of the evaporated medium leaving the evaporator.

A particular problem relating to heat exchangers of the plate type is that accumulated liquid medium in the lower parts of the evaporator will cause non-uniform streaming with a decreased efficiency as a result. One object with the present invention is thus to improve the efficiency of a heat exchanger of the plate type by minimising the amount of accumulated liquid medium in the evaporator.

Another problem regarding heat exchangers is that the superheater/supercooler is an external unit, making the heat exchangers bulky and not very cost efficient. Still a further object of the present invention is thus to provide a heat exchanger of the plate type with an integrated supercooler/superheater.

Figure 1:
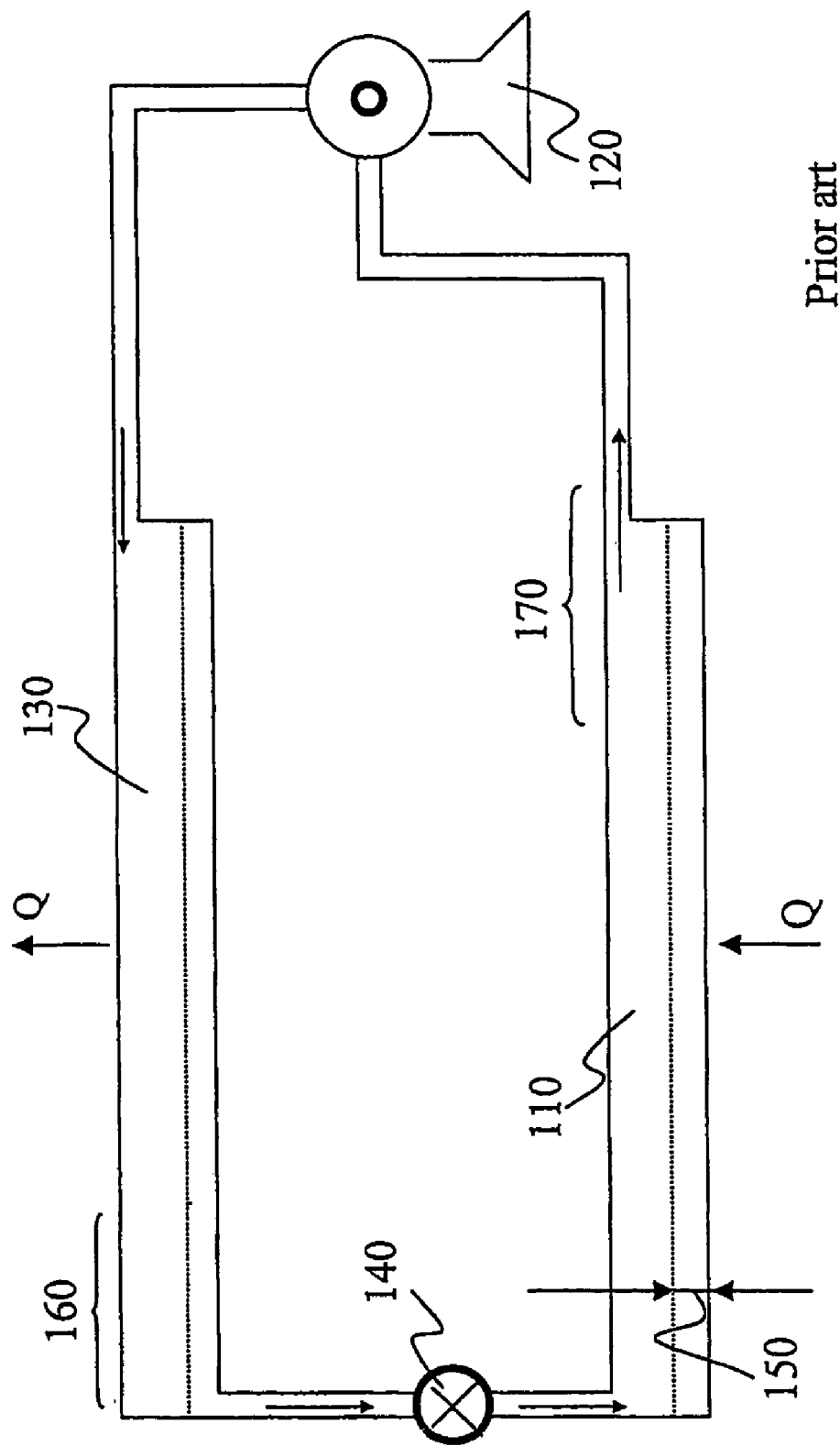
FIG. 1 illustrates the working principle of a conventional heat exchanger.
Figure 2:
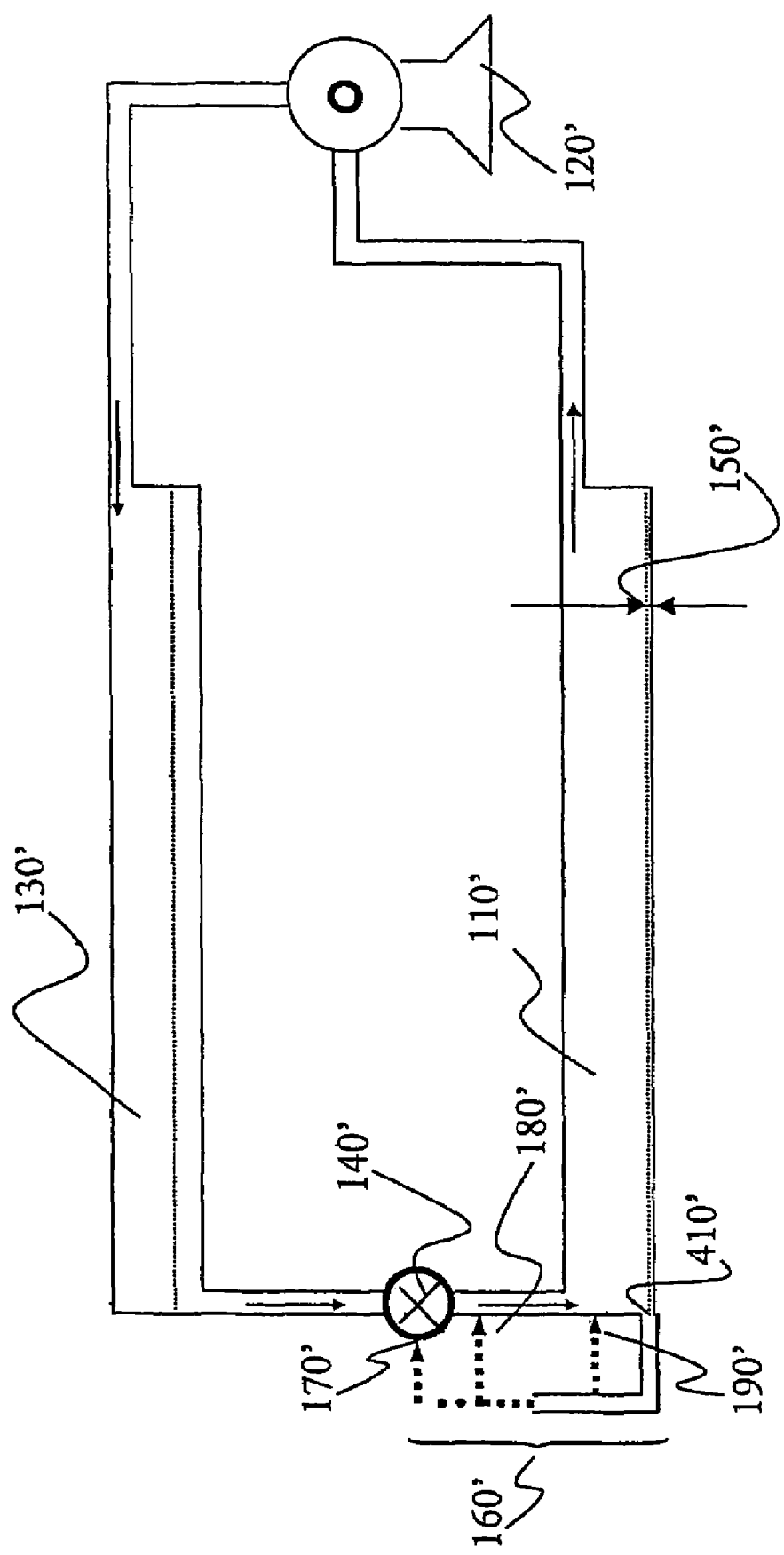
FIG. 2 illustrates different embodiments of an evaporator used in a heat exchanger according to the present invention.

With reference to FIG. 2, the working principle for an evaporator according to the present invention will now be described. A medium, e.g. a coolant medium such as freon, circulates from an evaporation chamber 110' to a compressor 120' and further to a condenser 130' and finally back into the evaporation chamber 110' via an expansion valve 140', in FIG. 2. According to the invention, the evaporation chamber 110' is equipped with drainage means 160' in its lower parts allowing accumulated medium in a liquid state to be piloted in an external feedback loop. This will decrease the liquid level 150' in the evaporation chamber and therefore increase the efficiency of the evaporator as well as decreasing the amount of liquid arriving at compressor 120', and as a consequence decrease the wear of the compressor 120', as understood by a person skilled in the art. The drainage means consist of a connection e.g. by a hose, pipe or tube between an additional outlet 410' in the lower parts of the evaporation chamber 110' and an additional inlet 170' in an expansion means, such as an expansion valve 140', in a preferred embodiment. The expansion means may also be a capillary tube or the like. The expansion valve 140' is equipped with an additional inlet 170' for the feedback drainage in the preferred embodiment. The additional inlet 170' in the expansion valve 140' experience a negative pressure producing an injector effect caused by the medium streaming through the expansion valve 140' from condenser 130' to evaporator 110' at a relatively high velocity. This injector effect can be exploited to transport the liquid medium from outlet 410' back into expansion valve 140'.

In an alternative embodiment, the drainage means does not lead back into the expansion valve 140' but into the connection between expansion valve 140' and evaporation chamber 110', as indicated by arrow 180' in FIG. 2.

In another embodiment, said external loop leads back directly into said evaporation chamber 110', illustrated by arrow 190' in FIG. 2.

In yet a further embodiment, said drainage means 160' comprise a pump.

Injector effects as described above may also be exploited in these alternative embodiments. This means that an expansion driven injector will be used to transport the medium through the drainage means according to the invention.

The evaporator, condenser and heat exchanger according to the present invention shall now be described in more detail for the specific case that the evaporator and condenser are realised in form of a heat exchanger of the plate type. Plate type heat exchangers are generally known devices for heat exchange between different media and are used in a multitude of contexts and the present invention is not limited to any special application. However, the invention is most easily applied to plate type heat exchangers of the wholly brazed type. This means that the heat exchanger consists of plates having a groove pattern and inlet and outlet connections for the media. The plates are placed in a package and are brazed together into a fixed unit. Separate ducts are thus formed for the media, typically circulating in opposite directions between alternate pairs of plates. The inlets and outlets extend through all plates and are thus common for the respective medium flowing in the ducts. This technique is commonly known and will not be described in detail here.

For illustrative purposes only, the invention will here be described for the particular case with a heat exchanger in which heat exchange takes place between three media, I, II and III but the invention is applicable for heat exchange between an arbitrary number of media. The media used could for instance be: I=freon, II=brine and III=water, but other alternatives exist as known to a person skilled in the art.

Figure 3:
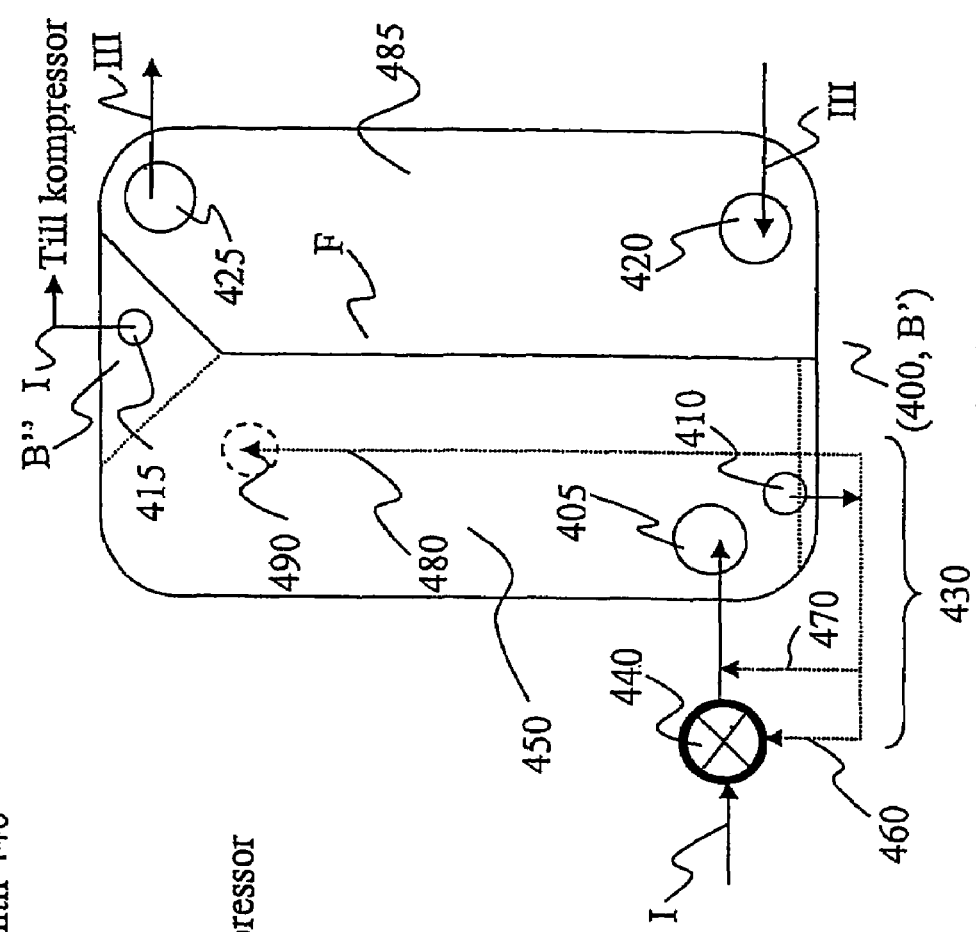
FIG. 3 illustrates an example of how a first plate side, i.e. an A' front side, of a plate type heat exchanger according to the present invention could be designed.

Referring now to FIG. 3, a front side A' of a plate 300 of a heat exchanger of the plate type according to the present invention is depicted. The plate in FIG. 3 is illustrated in its correct operational standing position, i.e. the force of gravity is working downwards in FIG. 3. The A' side is equipped with an inlet 305 and outlet 310 for the II medium together with an inlet 315 and outlet 320 for medium I. A barrier D separates the media from each other so that medium II will circulate to the left hand side of barrier D and medium I to the right hand side of barrier D in FIG. 3, i.e. in the condenser chamber 380. According to the invention, a further barrier E is provided which forms a delimited zone A" together with a channel C", between said zone A" and the condenser chamber 380 in which medium I circulates. The barriers are obtained by a suitable, interactive, groove and recess pattern between the plates as known, e.g. from the document WO00/03189 and will not be described in detail here.

Figure 4:
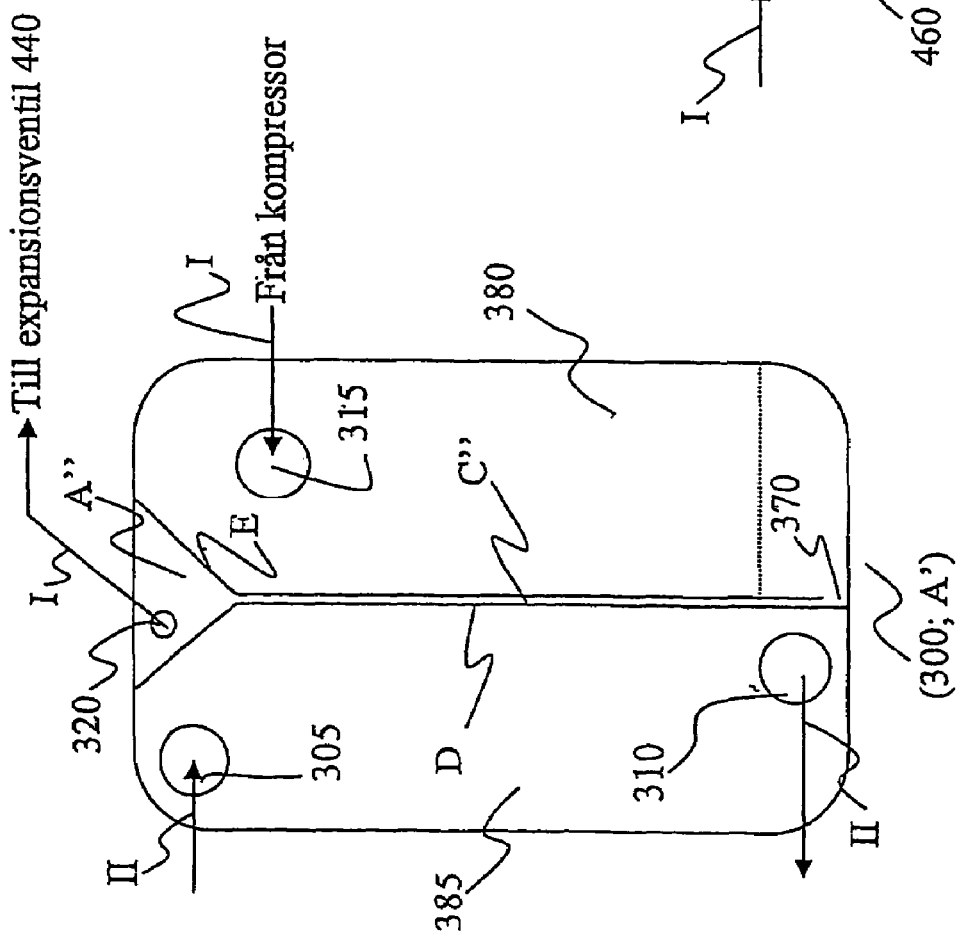
FIG. 4 illustrates an example of how a second plate side, i.e. a B' rear side, of a plate type heat exchanger according to the present invention could be designed.

Referring now to FIG. 4, the rear side, B', of the plate 300 in FIG. 3 is illustrated in its correct operational standing position. The B' side have inlets 405 and 420 together with outlets 415 and 425 and a barrier F which separates the media from each other so that medium I will circulate to the left, in the evaporation chamber 450, and medium II to the right, of barrier F in FIG. 4. In addition, the invention provides an outlet 410 in the lower parts of evaporation chamber 450, connected to the external drainage means 430, according to the present invention. The drainage means 430 have the identical function as the drainage means 160' described above with reference to FIG. 2, and can be realised in the same way. Thus, the drainage means 430 consist of a connection e.g. by a hose, pipe or tube between outlet 410 and expansion valve 440, illustrated by arrow 460 in FIG. 4, or, alternatively, between the outlet 410 and somewhere between expansion valve 440 and inlet 405, illustrated by arrow 470 in FIG. 4, or, alternatively, between outlet 410 and an additional inlet 490, illustrated by arrow 480 in FIG. 4. The drainage means can exploit the injector effect described above, i.e. comprise an expansion driven injector, and may possibly also comprise a pump, as explained above with reference to FIG. 2. The drainage according to the present invention thus automatically drains liquid from the evaporation chamber 450. During operation, this drainage thus continuously drains a relatively small amount of liquid from the evaporation chamber and then injects it back into the chamber. When the heat exchanger is turned off, or stops for some reason, liquid will accumulate in the evaporation chamber 450 as a result. However, the drainage according to the present invention efficiently drains the evaporation chamber 450 as soon as the heat exchanger is turned on. Thus, immediately after starting the heat exchanger, there will be a relatively large amount of liquid draining through the drainage, however, the amount of draining liquid will decrease rather fast. This drainage increases the efficiency of the evaporator and the heat exchanger and decreases the wear of the compressor, as a person skilled in the art realises.

Now, with reference to FIGS. 3 and 4, the working principle for the heat exchanger according to the present invention will be described. For purely illustrative purposes, a heat exchanger applied for a heat pump application will be described. Medium II, e.g. brine, enters at inlet 305 in FIG. 3 at a relatively higher temperature, e.g. corresponding to the ground temperature, e.g. at 12° C., and is piloted downwards in a duct chamber 385 under heat exchange with medium I, and thereafter leaves through outlet 310 at a lower temperature, e.g. 7°, to be piloted back to the ground in a closed loop.

Inlet 315 is fed with medium I, e.g. freon, by compressor so that medium I enters into condenser chamber 380 through inlet 315 under high pressure and high temperature, e.g. 80° C. Medium I is piloted towards the inlet 370 of the channel C" under heat exchange with medium III and further up through the channel C" and piloted through the delimited zone A" under heat exchange with itself. Thus, the zone A" according to the present invention provides a double effect in that it works as a superheater during the evaporation stage of medium I and as a supercooler during the condensing stage of medium I. Thus, medium I is further condensed in the delimited zone A". This increases the efficiency of the heat exchanger and reduces the wear of the compressor, as a person skilled in the art will understand.

The medium I leaves outlet 320 at a lower temperature, e.g. 32° C., and is thereafter fed to expansion valve 440. After passing the expansion valve 440, medium I enters through inlet 405 at a considerable lower pressure and temperature, e.g. 2° C. The medium I starts to evaporate at a lower pressure and evaporates further when heated in evaporation chamber 450. Medium I is then piloted towards the delimited zone B" under heat exchange with medium II, to exit through outlet 415. When arriving at the delimited zone B", the temperature of medium I in this illustrative example will be around 7° C. Medium I has a heat exchange with itself in the delimited zone B", as described above, and is thus in this stage, i.e. the evaporation stage, subject for above described superheater function. The superheater ensures that all liquid evaporates before arriving to the compressor, which will further increase the efficiency of the heat exchanger and reduce the wear of the compressor, as a person skilled in the art realises.

Furthermore, accumulated medium I in form of liquid will be fed back by the drainage means 430 according to the present invention, as described above. Medium I will thereafter be directed from outlet 415, at a higher temperature, e.g. 10° C., to the compressor in a closed loop.

Thus, medium I circulates in a closed loop from evaporation chamber 450 to the compressor and further to the condenser chamber 380 and thereafter back to the evaporation chamber 450 through expansion valve 440. Medium I can also circulate in the feedback loop formed by the drainage outlet 410 and the drainage means 430 according to the present invention, described above.

Medium III, e.g. water, enters through inlet 420 at a relatively lower temperature, e.g. 38° C., and leaves outlet 425 at a relatively higher temperature, e.g. 44° C., since medium III has heat exchange with medium I in the heat exchanger. Medium III enters into a duct chamber 485 through an inlet 420 at a relatively low temperature, e.g. 38° C., and is piloted through said duct chamber 485 under heat exchange with said medium I. Said medium III then leaves said duct chamber 485 through an outlet 425 at a relatively higher temperature, e.g. 44° C. Thus, as a net effect, medium II has given a certain amount of heat to medium III.

Although the present invention has been described in the case for an evaporator and condenser in a heat exchanger of the plate type used for a heat pump application, it shall be understood that the invention is applicable in a wide variety of heating and/or cooling applications. For instance, a person skilled in the art realises that above described process can realise an air condition application, the heat exchanger need not be of a plate type etc. Furthermore, the evaporator according to the invention can be used not only in heat exchangers but is applicable in any evaporating process. FIGS. 3 and 4 are not to scale and illustrate merely the working principle of the invention by way of example. Therefore, a person skilled in the art can realise the invention in many different ways without departing from the scope of the present invention as defined by the following claims.

The invention claimed is:

1. An evaporator of plate type having at least one inlet and at least one outlet allowing a medium to enter into and exit from said evaporator, said evaporator comprising:
    a plurality of interconnected evaporation chambers disposed in parallel, having at least one common inlet and at least one common outlet allowing a medium to enter into and exit from said chambers;
    an external loop configured to drain said medium from lower parts of said evaporation chambers and introduce said medium back into the evaporation chambers.

2. An evaporator according to claim 1, wherein said inlet is connected to an expansion means by connection means, said expansion means including an additional inlet, and wherein said external loop is configured to introduce said medium back into the evaporation chambers through the additional inlet of said expansion means.

3. An evaporator according to claim 1, wherein said inlet includes an additional inlet, and wherein said external loop is configured to introduce said medium back into the evaporation chambers through said additional inlet by an expansion driven injector.

4. An evaporator according to claim 1, wherein said external loop comprises a pump.

5. A heat exchanger, comprising an evaporator according claim 1.

6. A heat exchanger of plate type comprising:
    interacting alternating plates having a groove pattern forming at least first and second separate duct loop systems allowing a first medium to circulate in the first of said duct systems under heat exchange with a second medium circulating in the second of said duct systems, wherein said first duct loop system comprises a part forming a plurality of interconnected evaporation chambers having at least one common inlet and at least one common outlet allowing said first medium to enter into, and exit from, said chambers,
    wherein said evaporation chambers include an additional outlet connected to a drainage means for said first medium from said evaporation chambers' lower parts in an external loop and to introduce said first medium back into said evaporation chambers.

7. A heat exchanger according to claim 6, wherein said interacting plates form a third duct system in which a third medium can circulate under heat exchange with at least said first medium.

8. A heat exchanger according to claim 7, wherein said chambers include one delimited zone defined, and
    the outlet of said chambers is connected, via a compressor, to a part of said first duct system forming a condenser chamber having a substantially vertical channel piloting said first medium from said chamber's lower parts up into another delimited defined zone, wherein said first medium can circulate in said two delimited zones under heat exchange with itself.

9. A heat exchanger according to claim 8, further comprising:
    a first duct chamber including an inlet and outlet allowing said second medium to enter said first duct chamber through said inlet to be piloted through said first duct chamber under heat exchange with said first medium, and to leave said first duct chamber through said outlet, a plurality of interconnected evaporation chambers including a common inlet, a common outlet and one delimited zone, allowing said first medium to enter through said inlet to be piloted through said evaporation chambers under heat exchange with said second medium and further through said zone under heat exchange with itself, and to leave said evaporation chambers through an outlet, a compressor and a condenser chamber including an inlet and an outlet, said condenser chamber further having another delimited zone and a substantially vertical channel leading to said other delimited zone from said condenser chamber's lower parts and said compressor being connected to said outlet and said inlet, allowing said first medium to be piloted from said outlet into said condenser chamber through said inlet via said compressor and further piloted through said condenser chamber under heat exchange with said third medium, and further piloted up through said channel into and through said other zone through which said first medium is allowed to be piloted under heat exchange with itself and thereafter to leave said condenser chamber through said outlet, an expansion valve connected to said outlet and inlet allowing said first medium to be piloted from said condenser chamber into said evaporation chambers through said inlet via said expansion valve, and a second duct chamber having an inlet and an outlet allowing said third medium to enter into said second duct chamber through said inlet and to be piloted through said duct chamber under heat exchange with said first medium and allowing said third medium to leave said duct chamber through said outlet.

10. A heat exchanger according to claim 6, wherein said drainage means is arranged to introduce said first medium back into the evaporation chambers through an external expansion means feeding said inlet with said first medium.

11. A heat exchanger according to of claim 6, wherein said drainage means is arranged to introduce said first medium in an additional inlet by an expansion driven injector.

12. A heat exchanger according to claim 6, wherein said drainage means comprises a pump.

13. A heat pump system, comprising an evaporator according to claim 1.

14. An air condition system, comprising an evaporator according to claim 1.

* * * * *